United States Patent [19]

Norton

[11] Patent Number: 5,045,198
[45] Date of Patent: Sep. 3, 1991.

[54] FAUCET-MOUNTED MICROBIAL FILTER

[75] Inventor: William W. Norton, Buffalo Grove, Ill.

[73] Assignee: Culligan International Company, Northbrook, Ill.

[21] Appl. No.: 548,683

[22] Filed: Jul. 5, 1990

Related U.S. Application Data

[63] Continuation-in-part of Ser. No. 389,605, Aug. 4, 1989, Pat. No. 4,980,056.

[51] Int. Cl.⁵ .............................................. B01D 61/08
[52] U.S. Cl. .............................. 210/321.87; 210/442; 210/500.23
[58] Field of Search ................... 210/282, 232, 321.87, 210/500.23, 254, 257.2, 442, 651

[56] References Cited

U.S. PATENT DOCUMENTS

| 4,401,567 | 8/1983 | Shindo et al. | 210/500.23 X |
| 4,530,809 | 7/1985 | Shindo et al. | 264/210.7 |
| 4,547,289 | 10/1985 | Okano et al. | 210/442 X |
| 4,636,307 | 1/1987 | Inoue et al. | 210/321.87 X |
| 4,663,227 | 5/1987 | Yamamori et al. | 428/315.7 |
| 4,675,213 | 6/1987 | Yamamori et al. | 427/244 |
| 4,676,896 | 6/1987 | Norton | 210/192 |
| 4,933,080 | 6/1990 | Rundzaitis et al. | 210/232 |

Primary Examiner—Frank Spear
Attorney, Agent, or Firm—Gerstman & Ellis, Ltd.

[57] ABSTRACT

A faucet-mounted filter in which a housing is positioned in flow transmitting relation with the water flow line. A microporous, hollow fiber filter bundle is positioned to sealingly occlude water flow through the housing so that all water flow through the housing must pass through porous walls of the hollow fibers of the filter. The pores of the hollow fiber walls are no larger than 0.22 micron, as measured by the particles that the pores pass. Thus the filter is capable of microbial filtering.

19 Claims, 3 Drawing Sheets

FAUCET-MOUNTED MICROBIAL FILTER

CROSS REFERENCE TO RELATED APPLICATION

This is a continuation-in-part of U.S. application Ser. No. 389,605, filed Aug. 4, 1980, now U.S. Pat. No. 4,980,056.

BACKGROUND OF THE INVENTION

The supplying of microorganism-free water to users is a continuing technological problem, although water treatment is an old technology which finds use in virtually every city. Typically, the water is chlorinated to destroy microorganisms, with the chlorinating agents being added in quantities so that only minimal amounts of chlorine remain in the water after microorganisms and other organic materials have been neutralized by the free chlorine present.

One specific technical problem that remains to the present day is the problem which water that sits in stagnant manner in faucets between uses can exhibit a growth of microorganisms. Thus, when the faucet is turned on after a long period of disuse, the first aliquot of water delivered can have a relatively high bacterial count, even if the water was initially filtered and chlorinated.

This problem is addressed in Norton U.S. Pat. No. 4,676,896, in which a faucet-mounted ultraviolet irradiation unit is provided for purification of water at the faucet, to inactivate bacteria that may have grown upstream in the line during a period of inactivity, and also to inactivate bacteria and virus present in the water as supplied. Such a unit of course requires electric power.

By this invention, a faucet-mounted water purifier is provided which requires no electric power, and which can be used for the reliable removal of bacteria, and even virus, from water as it passes through the faucet. Because the invention of this application is a faucet-mounted unit, it is capable of removing microorganisms from water which has sat in stagnant manner in the faucet region for a substantial period of time, with resulting bacterial growth. The faucet-mounted purifier of this invention can remove bacteria that are downstream from the conventional filters and irradiators of the prior art which are customarily used in water lines, so that even initial aliquots of water from a freshly turned-on faucet will be substantially microorganism free.

DESCRIPTION OF THE INVENTION

In this invention, a faucet-mounted filter is provided for water passing through the faucet, with the faucet defining a water flow line. A housing is positioned in flow transmitting relation with the water flow line of the faucet. Microporous, hollow fiber filter means are positioned to sealingly occlude water flow through the housing. Thus, all water flow through the housing must pass through porous walls of hollow fibers of the filter means. The pores of the hollow fiber walls are no larger than 0.22 micron, with the result that the filter is capable of microbial filtering.

Preferably, the pores of the hollow fiber filter walls are sized from 0.005 to 0.05 micron, as measured by the particle sizes they pass or block. Thus, it becomes possible not only to filter microorganisms which are of the size of bacteria, but also the filter of this invention may be an anti-viral filter, for removal of the smallest microorganisms.

Preferably, the faucet is connected to a source of prefiltered water of low turbidity and solids, to prolong the useful life of the hollow fiber filter means used herein. Thus, the hollow fiber filter means in this invention is used primarily to collect only small microorganisms and other particulate matter which passes through conventional water line filters.

The microporous, hollow filters used in this invention may be made for example of polyethylene, which is oriented in the lengthwise direction of the fiber. Such hollow fibers may have elongated pores which are formed by microfibrils that are oriented in the lengthwise direction of the fiber and "knotted" portions that are connected to the microfibrils substantially at right angles thereto. The pores may be contiguous with each other from the inner wall surface to the outer wall surface, to form a stacked, multicellular structure. The porosity of the hollow fibers may be about 30 to 90 percent by volume, to exhibit a water permeability through the wall of at least about 65 ml. per $m^2$ per hour per .mm Hg. Such materials are as described in Shindo et al. U.S. Pat. No. 4,401,567.

Also, the microporous hollow fibers of this invention may be made of a hydrophobic material such as polyethylene, polypropylene, poly-4-methylpentene-1, polyvinylidenefluoride, polytetrafluoropropylene, copolymers of hexafluoropropylene and tetrafluoropropylene, and copolymers of a fluorinated olefin monomer and an olefin monomer. Such hollow fiber materials may have a porosity of 20 to 90 volume percent, having a substantial amount (i.e. not less than 10 percent and preferably nearly 100 percent) of the surface area of the pores thereof coated with from 1 to 100 percent by weight of a hydrophilizing agent, based on the weight of the hollow fibers. The hydrophilizing agent, for example, may be a monoester of propylene glycol and a saturated fatty acid having 12 to 22 carbon atoms which is solid at about 20 degrees C. and substantially insoluble in water. Such materials are as described in Yamamori et al. U.S. Pat No 4,663,227.

Other patents which are significant to the type and us of porous hydrophobic fibers which may be used in accordance with this invention include Yamamori et al. U.S. Pat. No. 4,675,213; Shindo et al. U.S. Pat. No. 4,530,809; and Inoue et al. U.S. Pat. No. 4,636,307.

Preferably, the hollow fiber filter means of the faucet-mounted filter comprises a U-shaped bundle of the hollow fibers of the filter means. A sealing barrier of potting compound is provided to occlude water flow through the housing. The U-shaped bundle defines a pair of arms that sealingly extend through the sealing barrier, to present open bore ends of the hollow fibers to the housing interior at one side of the sealing barrier. The remainder of the U-shaped bundle occupies the housing interior at the other side of the sealing barrier, to provide a structure in which no fluid can flow through the housing without passing through a wall of one of the hollow fibers.

It is also preferred to provide means of draining the housing when water is not flowing therethrough. Such means is typically positioned upstream of the hollow fiber filter means, so that, when the faucet is off, the hollow fiber filter means will not stand for a long time in stagnant water. This reduces the possibility of bacteria penetrating through the hollow fiber walls by dividing and growing through the pores, which is a phenomenon that has been previously noticed with respect to bacterial filters. Preferably all flow line portions downstream of the filter are positioned to drain naturally.

Generally, a water pressure of about 40 psi or more is provided to the system. Such a water pressure will cause water to be forced through the pores of the hollow fiber filter for rapid flow when the faucet is open, even if the pores are hydrophobic.

Additionally, the microporous hollow fiber filter means may be positioned in its housing to sealingly occlude water flow through the housing, with the outer end of the filter being at the outermost end of the water flow line in the faucet. Thus, there is no downstream portion of the faucet where stagnant water can reside to breed bacteria.

It is also preferred for at least portions of the inner wall of the housing to carry a coating of hydrophobic material such as polytetrafluoroethylene to facilitate complete drainage of the housing between uses of the faucet. This is particularly advantageous since the filter membrane is thus kept away from the long term exposure to liquid water. This, in turn, suppresses the tendency of bacteria to grow through the pores of the filter, even although the pores are too small for the passage of normally-sized bacteria.

Additionally, it may be desirable for the porous walls of the hollow fibers to comprise a sufficient concentration of silver to exhibit at least bacteriostatic characteristics. Examples of such hollow fibers are as described in Inoue et al. U.S. Pat. No. 4,636,307, in which the silver is particularly absorbed on an activated carbon component of the fibers.

Additionally and preferably, the prefiltered water of low turbidity and solids may be prepared by a reverse osmosis process and connected to the faucet as the desired source of water. The useful life of individual modules of the filters may thus be prolonged.

The filter of this invention may be in combination with a faucet defining a first water flow line and first flow valve means for controlling flow through the first water flow line. The housing which carries the filter is positioned in the faucet in flow transmitting relation with the first water flow line. Specifically, the housing may be positioned upstream from the first flow valve means.

The faucet may also include a second flow line and second flow valve means for the second flow line. The second flow line may communicate with the first flow line downstream from the housing. Thus, water which has been filtered may be mixed as desired with another source of water, or it may be separately provided. For example, the first flow line may be connected at its upstream end to a source of pressurized water which has been purified by reverse osmosis. The second flow line may communicate with a different source of water, for supply as desired of alternate sources of water.

If desired, at least one of the flow lines may define thermostatically controlled valve means to limit the flow of hot water when the water is above a predetermined temperature. Thus, the filter means may be protected from excessively hot water.

It is also desirable with these multiple source faucet arrangements for the housing which communicates with a pair or more of flow lines to define drainage port means, to permit draining of water from the housing between uses of the faucet. Thus, the filter may be kept from long term contact with standing, stagnant water as described above to prevent the bacteria grow-through phenomena.

The faucet-mounted filter of this invention is usable for difficult microorganism-removing situations. For example, it may be used to provide safe drinking water in regions where the water contains *Giardia lamblia* cysts, which are not easily inactivated by chlorination, or where the presence of any other microorganisms such as bacteria is expected. Similarly, the faucet-mounted filter of this invention can be used to remove virus from water, for example polio virus or rotavirus.

Additionally, the faucet-mounted filter of this invention may be used to "polish" ultrapure electronic chip manufacturing water. Such a post treatment of previously filtered water may be valuable in that a single bacteria can straddle two conductors on the surface of an electronic chip having microfine circuitry, causing a short circuit which ruins the chip.

The microporous, hollow fibers used in this invention may be hydrophobic in nature or optionally hydrophilic, as may be desired.

DESCRIPTION OF THE SPECIFIC EMBODIMENTS

Figure 1:
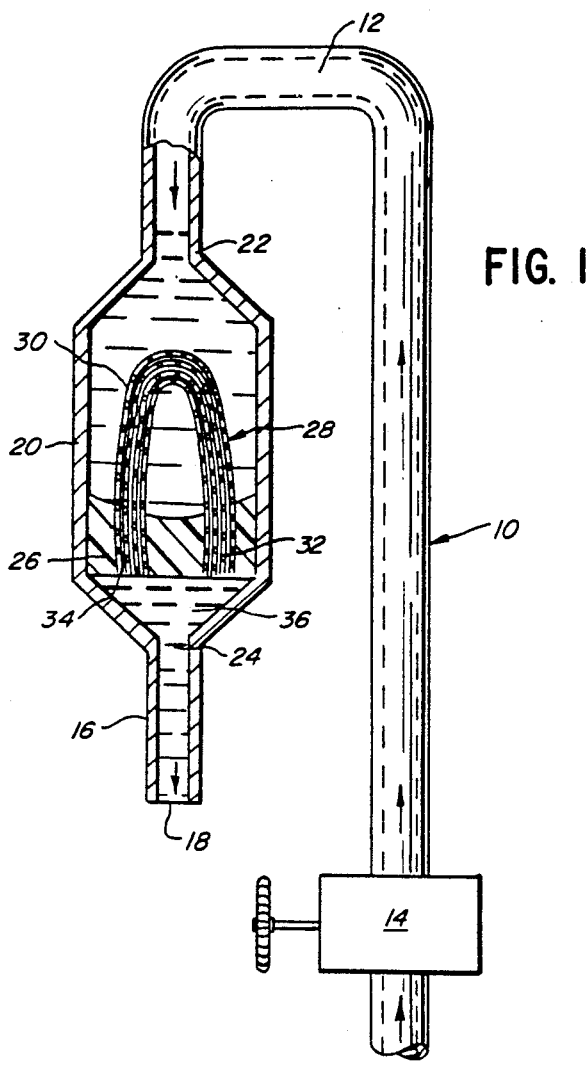
FIG. 1 is an elevational view, taken partly in section, of a faucet which carries the faucet-mounted filter of this invention.

Referring to FIG. 1, a conventional faucet 10 is disclosed having a water flow line 12 connected to a source of pressurized water, with the water flow through line 12 being controlled by a conventional valve and handle 14, which is shown in schematic manner. Water flow line 12 defines a distal, downwardly extending section 16 adjacent the water outlet end 18, which includes a filter housing 20 having an upper inlet 22 and a lower outlet 24 for flowing water.

The interior of filter housing 20 is occluded by a mass of potting compound 26 which may be centrifugally cast, if desired, in accordance with known technology for the manufacturing of corresponding potted ends of hollow fiber dialysis units or the like.

A U-shaped bundle 28 of microporous hollow fibers 30 is positioned within housing 20, with the respective arms 32, 34 of the U-shaped bundle extending through potting compound 26 so that the bores are open at their respective ends to the interior of housing 20 in the region 36 below potting compound 26. Thus, the bores of hollow fibers 30 form a U-shaped path, with both ends of the bores being open through the potting compound 26 to the region 36.

The individual, hollow fibers 30 may be conventionally sized hollow fibers for filtering use, for example as described in the previously cited patents, and are preferably made of polyethylene. The size of the pores within the walls of the hollow fibers may specifically be from about 0.01 to 0.02 micron, as determined by the maximum sized particles that they pass under pressure.

Accordingly, when handle 14 of the faucet is turned on and pressurized water passes through flow line 12, the pressurized water, being at typically 40 psi or greater, is forced through the pores of hollow fibers 30 in bundle 28, resulting in the filtering of bacteriasized particles and the like. Then, the filtered water pours out of the ends of the respective bores of hollow fibers 30 into chamber portion 36 and out of the conduit end 18, to provide the user with water which is free of bacteria, and preferably virus as well when the pores of the hollow fibers 30 are sized at the lower end of the possible size range. Cysts and protozoa of all kinds are of course also removed, since they tend to be of larger size than bacteria, along with small, nonliving particles and the like.

The water produced by the faucet-mounted filter of this invention is ultra pure, and typically suitable for critical electronic manufacturing processes, for consumption by immune-disabled individuals, or the like.

Figure 2:
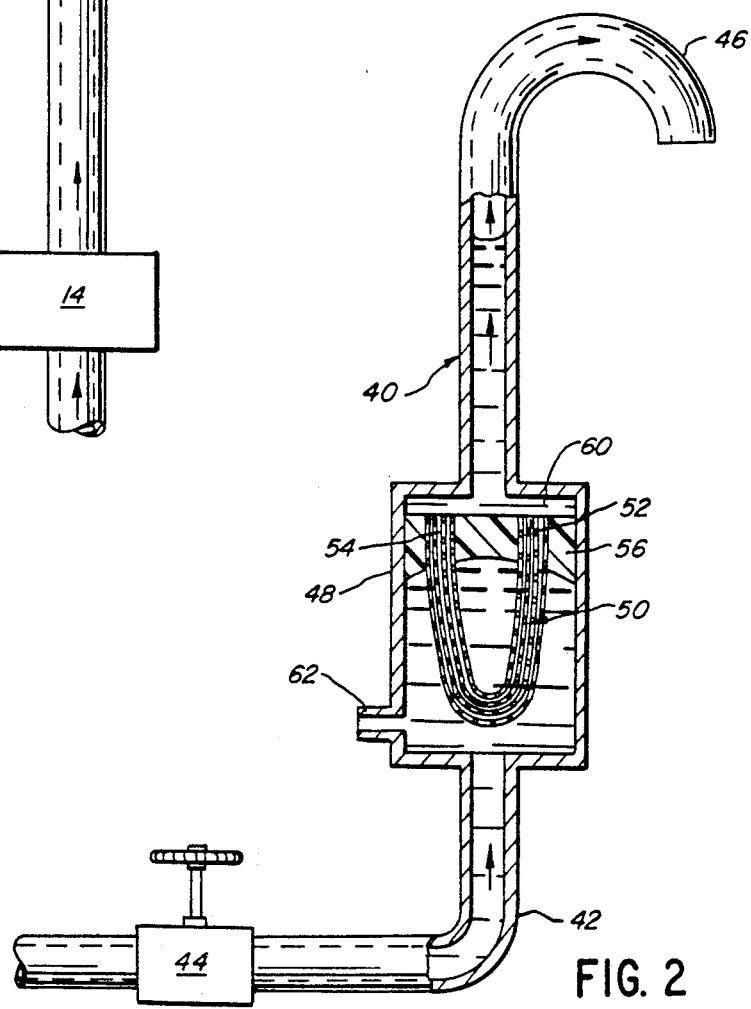
FIG. 2 is an elevational view, taken partly in section, of another embodiment of a faucet carrying the faucet-mounted filter of this invention.

Turning to FIG. 2, a second faucet-mounted filter embodiment 40 is disclosed. In this embodiment, pressurized water line 42 is controlled by a conventional faucet valve 44 and terminates in a swan neck curved end 46 for delivery of purified water to the user.

Housing 48 is provided in flow line 42. U-shaped bundle 50 of porous, hollow fibers is positioned within housing 48, with the ends of the bundle 52, 54 being mounted in a mass of potting compound 56, similar to the previous embodiment potting compound 56 holds the ends of the bores of each of the microporous, hollow fibers in the bundle in contact with chamber portion 60, positioned in this case above the bundle. Thus, as before, no flow of fluid can take place through housing 48 without the fluid passing through the porous walls of the hollow fibers of bundle 50. Such hollow fibers may be of conventional construction as described above.

Additionally, housing 48 may define a lower drain 62 which causes housing 48 to drain when faucet valve 44 is closed. This, in turn, will cause the water in the system above drain 62 to flow rearwardly when the faucet is shut-off to remove standing water from contact with U-shaped hollow fiber filter 50. This can be particularly done when the pores of hollow fiber bundle 50 are of hydrophilic nature so that the water can flow at little or no pressure through them. As stated above, such draining provides further assurance that bacteria cannot divide in the pores of the hollow fibers, reducing their size and migrating through pores that are normally bacteria blocking.

The flow capacity of drain 62 is low compared with the overall flow capacity of flow line 42, so that an ample quantity of processed water will flow through outlet port 46.

As an added advantage of such a drain system, when the faucet is off, water which has passed through membrane bundle 50 will flow backwards as water passes out of drain port 62. This can dislodge and remove some of the materials held back by filter bundle 50 and cause it to be removed from the system out of drain 62, to provide an increased useful life to filter bundle 50. Also, the filter may be cleaned by a pressurized backflush of water using drain port 62.

Figure 3:
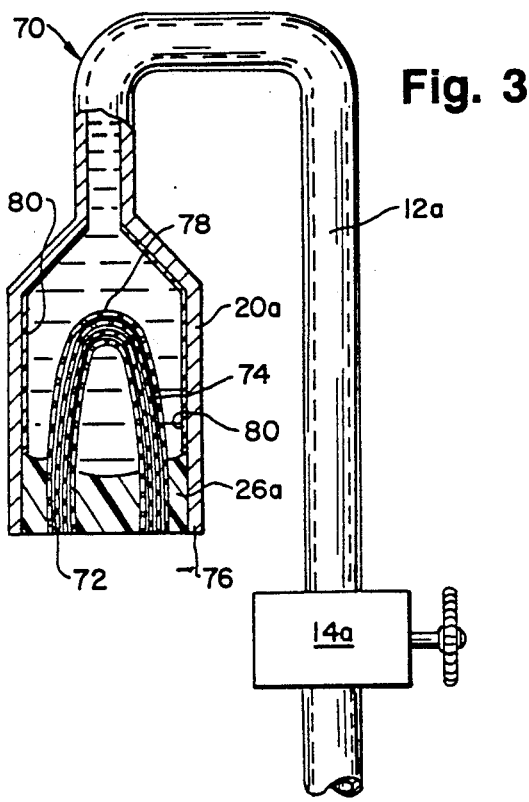
FIG. 3 is an elevational view, taken partly in section, of another embodiment of a faucet and faucet-mounted filter of this invention.

Referring to FIG. 3, faucet 70 is of substantially similar design to the faucet of FIG. 1, except that the lower tip of the faucet has been omitted so that the outer ends 72 of the U-shaped bundle of hollow fiber filters 74 is substantially at the outermost end 76 of the water flow line in the faucet.

As before, the faucet valve 14a controls flow through flow line 12a into housing 20a, which carries U-shaped bundle 74 of hollow fibers. Potting compound 26a is provided as in previous embodiments to secure the outer ends 72 of the bundle in position.

Correspondingly, the inner end 78 of bundle 74 is positioned on the side of potting compound 26a opposed to the outer ends 72, being positioned within housing 20a. Thus, all water flow through the faucet must pass through the porous walls of the hollow fibers of bundle 74. As before, the pores of the hollow fiber walls are of a bacteria-blocking size as previously specified.

As a further improvement, the inner wall of housing 20a carries a coating 80 of hydrophobic material: for example polytetrafluorethylene or silicone. Thus, when faucet valve 14a is closed off, water will tend to drain through a hydrophilic filter bundle 74 until the interior of housing 20a is empty, to reduce the amount of stagnant bacteria-growing water that can be retained between uses of the faucet. The presence of hydrophobic layer 80 facilitates the removal of water from the interior of housing 20a. It is also preferable for the material of the fibers of bundle 74 to comprise a sufficient concentration of silver to exhibit at least bacteriostatic characteristics. This may be accomplished by mixing activated carbon carrying such silver as a component o the plastic material that forms such hollow fibers, or by placing such a material loosely in the bores of hollow fibers, so that flow can still take place through the hollow fiber bores.

It is also preferred to connect the faucet of FIG. 3, and other embodiments of this invention as well, with a source of reverse osmosis water, to prolong the useful life of hollow fiber filter bundle 74.

Figure 4:
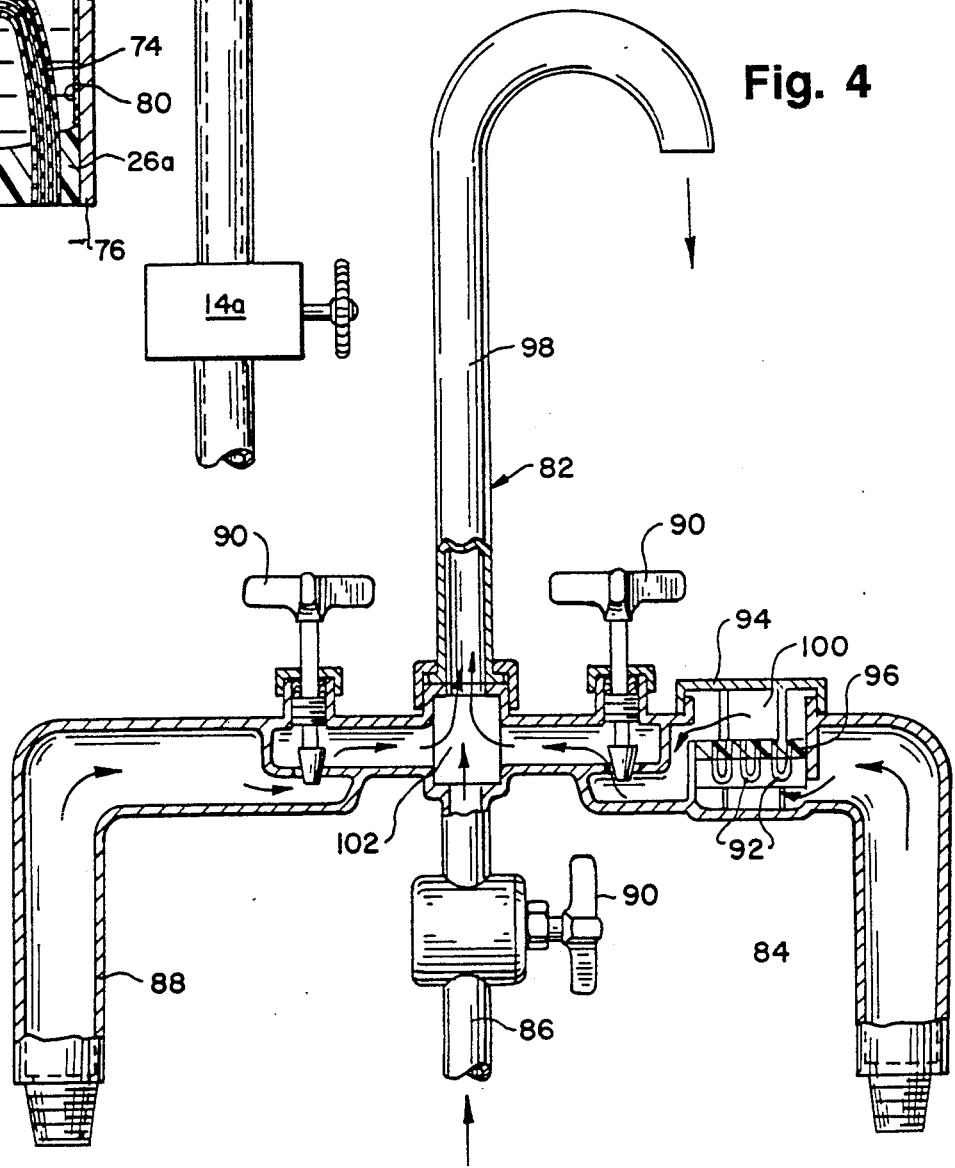
FIG. 4 is an elevational view, taken partly in section, of a multiple conduit faucet which carries the faucet-mounted filter of this invention.

Referring to FIG. 4, Faucet 82 is provided in which the faucet defines three water flow lines 84, 86, 88, each being controlled by a valve 90 as shown, a series of U-shaped microporous hollow fiber filter bundles 92 are provided in a housing 94, with their ends extending through a layer of potting compound 96, these being arranged in first water flow line 84 which communicates through faucet neck 98. As shown, water flowing through line 84 passes upwardly through the U-shaped filters 92 into an upper chamber 100, and from there through the particular valve 90 that controls first flow line 84.

Thus, the group of filter bundles 92 positioned in housing 94 may be connected only to a source of reverse osmosis water or the like through first flow line 84, while cold tap water may be provided through a second flow line 86 and hot tap water through a third flow line 88. Thus, faucet 82 may be provided with three different sources of water, which can come together in chamber 102 to be mixed and expelled from faucet neck 98.

Thus, with a faucet of this type, the conventional hot and cold water sources are available, but, additionally, a source of purified, bacteria free water is available for drinking, or for special uses such as in the electronics field or the like.

Figure 5:
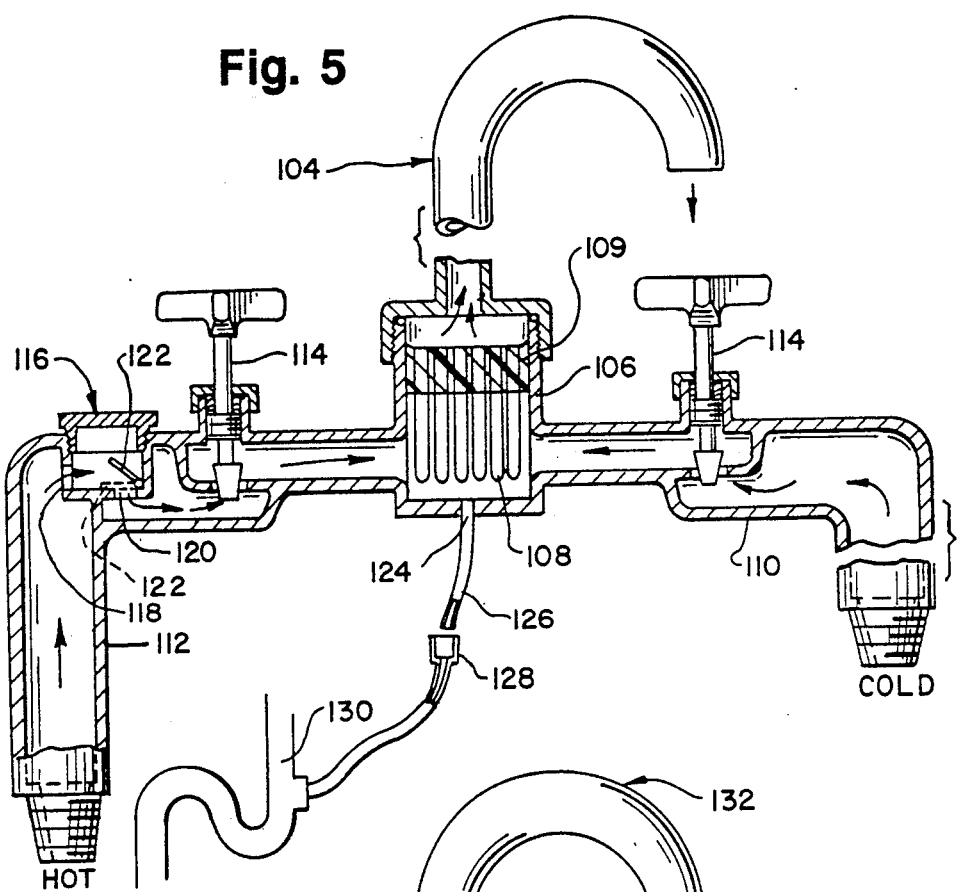
FIG. 5 is another embodiment of multiple conduit faucet system, carrying the faucet-mounted filter of this invention.

Referring to FIG. 5, another embodiment of the faucet-mounted filter of this invention is shown. In this particular embodiment, faucet 104 carries a filter housing 106 and U-shaped bundles 108 of hollow fibers in accordance with this invention, held in potting compound 109. In this particular embodiment, housing 106 communicates with a pair of different flow lines 110, 112 for water to be filtered. Each of the flow lines carries a conventional faucet valve 114. Thus, water from both flow lines passes into housing 106 for filtering by means of hollow fiber filter bundles 108, to provide microbial filtering to the water passing therethrough.

As shown, one of the flow lines 112 has thermostatically controlled valve means contained in a housing 116. As shown, water from flow line 112 can enter into housing 116 through aperture 118, and exits therefrom through aperture 120, to pass onwardly to filter chamber 106. Typically, water line 112 is a hot water line, and it is desirable to protect the material of filter bundles 108 from excessively hot water.

Accordingly, a bimetal bar or sheet thermostat 122 is provided, being positioned to close over outlet port 120 in the presence of a predetermined maximum water temperature, as shown in the dotted line position of thermostat 122. Thus, as the hot water temperature approaches the predetermined maximum temperature, thermostat 122 bends to cover outlet port 120, significantly restricting or terminating the flow of hot water through line 112. The material of filter bundles 108 is accordingly protected from excessive temperature.

Upon cooling of the hot water in line 112, thermostat 122 will then back upwardly again, reopening access to outlet port 120.

Additionally, filter housing 106 defines a drain port 124 at a lower portion thereof so that, when both faucet valves 14 are closed, stagnant water will not be stored in housing 106, but rather will drain through hydrophilic filters 108, out of port 124, through tubing 126 which includes a conventional siphon break 128, to drain 130. Thus, the filter material 108 may be kept from long-term contact with standing water which, as previously described, can increase the bacteria "grow-through" phenomenon, to reduce the effective bacteria-blocking characteristic of the faucet and mounted filter of this invention.

Figure 6:
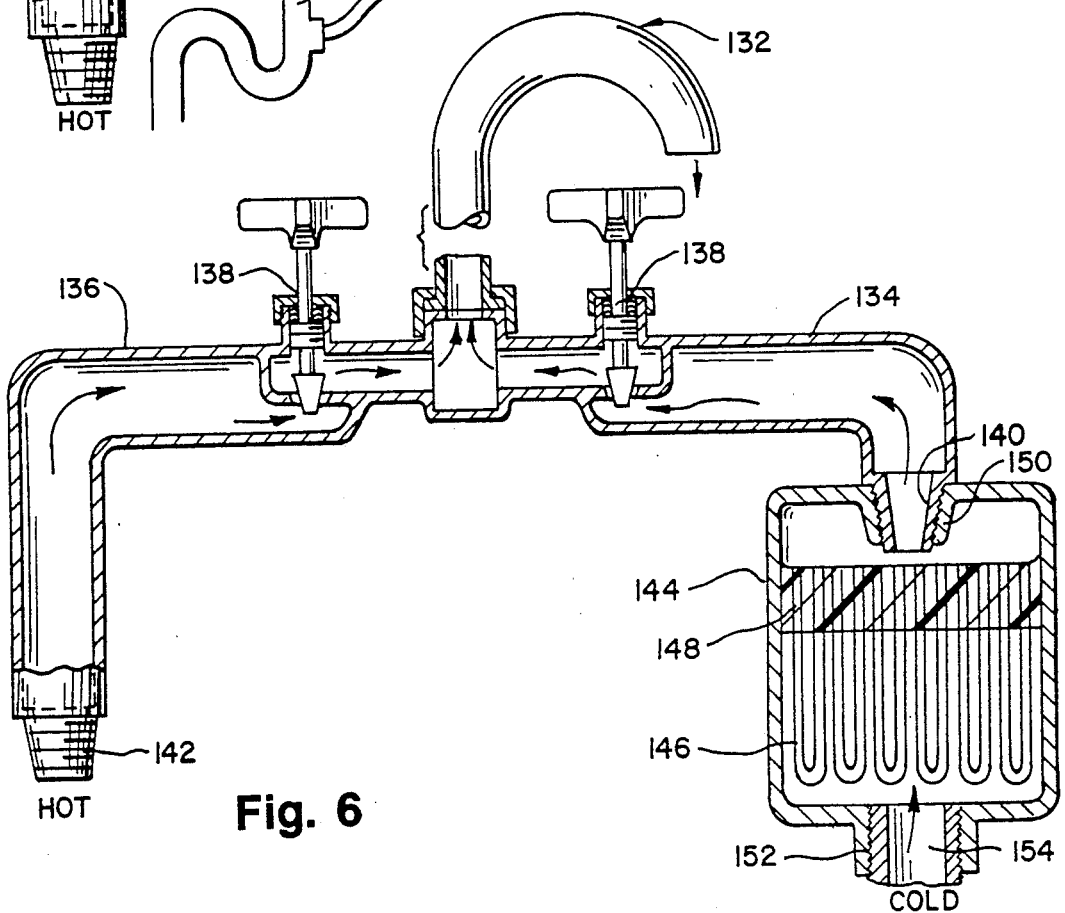
FIG. 6 is an elevational view, taken partly in section, of a third embodiment of multiple conduit faucet and faucet-mounted filter of this invention.

Referring to FIG. 6, faucet 132 is similar to the embodiment of FIG. 4, except that only two water flow conduit 134, 136 are present, being respectively controlled by faucet valves 138.

In this particular invention, faucet 132 may be generally a conventional faucet that is currently available at a plumbing supply store, having threaded connector ends 140, 142 for connection with other pipes.

By this invention, filter housing 144, which contains an arrangement of filter bundles 146 embedded in potting compound 148 as previously described, defines a female threaded connector 150 which is proportioned to connect with conventional connector 140 of faucet 132. At the opposed end, housing 144 defines a conventional threaded pipe connection 152 for joining with a conventional water pipe 154. Thus, the structure of FIG. 6 shows how generally conventional plumbing equipment can be used in conjunction with a module comprising housing 144, so that conventional plumbing may be adapted by addition of the module to receive the faucet mounted microbial filter of this invention.

Accordingly, a faucet-mounted filter is provided for the production of ultrapure, microorganismfree water. Stagnant, bacteria-laden aliquots of water which have typically passed through conventional filter systems may be further purified, so that ultrapure water may be provided without fail to the user.

The above has been offered for illustrative purposes only, and is not intended to limit the scope of the invention of this application, which is as defined in the claims below.

THAT WHICH IS CLAIMED IS:

1. A faucet-mounted filter for water passing therethrough, in combination with a faucet defining a water flow line, which comprises: a housing positioned in said faucet in flow transmitting relation with said water flow line; microporous, hollow fiber filter means positioned in said housing to sealingly occlude water flow through said housing, said hollow fiber filter means defining an inner and an outer end, the outer end of said filter means being at the outermost end of the water flow line in said faucet, whereby all water flow through said faucet must pas through porous walls of hollow fibers of the filter means, the pores of said hollow fiber walls being no larger than 0.22 micron, whereby said filter is capable of microbial filtering.

2. The faucet-mounted filter of claim 1 in which the pores of said hollow fiber walls are sized from 0.005 to 0.05 micron.

3. The faucet mounted filter of claim 2 in which said faucet is connected to a source of prefiltered water of low turbidity and solids.

4. The faucet-mounted filter of claim 1 in which said hollow fiber filter means comprises a U-shaped bundle of said hollow fibers of the filter means; a sealing barrier of potting compound occluding water flow through said housing, said U-shaped bundle defining arms that sealingly extend through said sealing barrier to present open bore ends of said hollow fibers to the outermost end of said faucet at one side of the sealing barrier, while the remainder of the U-shaped bundle occupies the housing interior at the other side of the sealing barrier.

5. The faucet-mounted filter of claim 1 in which at least portions of the inner wall of said housing carry a coating of hydrophobic material to facilitate complete drainage of the housing between uses of the faucet.

6. The faucet-mounted filter of claim 1 in which said porous walls of the hollow fibers comprise a sufficient concentration of silver to exhibit at least bacteriostatic characteristics.

7. The faucet-mounted filter of claim 1 in which said faucet is connected to a source of water prepared by a reverse osmosis process, said water being of low turbidity and solids.

8. A faucet-mounted filter for water passing therethrough, in combination with a faucet defining a first water line and first flow valve means for controlling flow through said first water flow line, which comprises a housing positioned in said faucet upstream from said first flow valve means in flow transmitting relation with said first water flow line; microporous, hollow fiber filter means positioned in said housing to sealingly occlude water flow through said housing, whereby water flow through said first water flow line passing through said housing must pass through porous walls of hollow fibers of the filter means, the pores of said hollow walls being no larger than 0.22 micron, whereby said filter is capable of microbial filtering, said housing being integrally positioned in said first water flow line, said faucet also including a second flow line and second flow valve means for the second flow line, said second flow line communicating with the first flow line downstream from said housing.

9. The faucet-mounted filter of claim 8 in which said first flow line is connected at its upstream end to a source of pressurized water which has been purified by reverse osmosis, said faucet including at least one second flow line that communicates with the first flow line downstream from said housing, said second flow line communicating with a different source of water.

10. The faucet-mounted filter of claim 8 in which said housing communicates with a pair of different flow lines for water to be filtered, at least one of said flow lines defining thermostatically controlled valve means to limit the flow of hot water through said one line above a predetermined temperature, to protect the filter means from excessively hot water.

11. A faucet-mounted filter of claim 8 in which drain port means are provided, and said drain port means connects with a flow conduit connecting to the drain used by said faucet, said flow conduit including siphon break means.

12. The faucet-mounted filter of claim 11 in which at least portions of the inner wall of said housing carry a coating of hydrophobic material to facilitate complete drainage of the housing between uses of the faucet.

13. The faucet-mounted filter of claim 11 in which said porous walls of the hollow fibers comprise a sufficient concentration of silver to exhibit at least bacteriostatic characteristics.

14. The faucet-mounted filter of claim 8 in which said hollow fiber filter means comprises a U-shaped bundle of said hollow fibers of the filter means; a sealing barrier of potting compound occluding water flow through said housing, said U-shaped bundle defining arms that sealingly extend through said sealing barrier to present open bore ends of said hollow fibers to one side of said sealing barrier, while the remainder of said U-shaped bundle occupies the housing interior at the other side of the sealing barrier.

15. A faucet-mounted filter for water passing therethrough, in combination with the faucet defining first and second water flow lines and first and second flow valve means respectively controlling flow of said first and second water flow lines, said faucet-mounted filter comprising a housing positioned in said faucet in flow transmitting relation with said first and second water flow lines; microporous, hollow fiber filter means positioned in said housing to sealingly occlude water flow through said housing, whereby water flow through said first water flow line passing through said housing must pass through porous walls of hollow fibers of the filter means, the pores of said hollow walls being no larger than 0.22 micron, whereby said filter is capable of microbial filtering, at least one of said first and second flow lines defining thermostatically controlled valve means to limit the flow of hot water to said hollow fiber filter means above a predetermined temperature, to protect the filter means from excessively hot water.

16. The faucet-mounted filter of claim 15 in which said first and second flow lines are connected at their upstream ends to a source of pressurized water that has been purified by reverse osmosis.

17. The faucet-mounted filter of claim 15 in which said first and second flow lines each carry a flow control valve, said housing also defining drain port means to permit draining of water from said housing between uses of the faucet.

18. The faucet-mounted filter of claim 15 in which at least portions of the inner wall of said housing carry a coating of hydrophobic material to facilitate complete drainage of the housing between uses of faucet.

19. The faucet-mounted filter of claim 15 in which said hollow fiber filter means comprises a U-shaped bundle of said hollow fibers of the filter means; a sealing barrier of potting compound occluding water flow through said housing, said U-shaped bundle defining ends that sealingly extend through said sealing barrier to present open bore ends of said hollow fibers to one side of said sealing barrier, while the remainder of said U-shaped bundle occupies the housing interior at the other side of the sealing barrier.

* * * * *